[54] APPLANATION TONOMETER

[75] Inventor: Carmelo Piazza, Jackson Heights, N.Y.

[73] Assignee: Mel Optics Company, Jackson Heights, N.Y.

[22] Filed: Mar. 18, 1974

[21] Appl. No.: 451,798

[52] U.S. Cl. .................................................. 73/80
[51] Int. Cl.² ........................................... A61B 3/16
[58] Field of Search ........................................ 73/80

[56] References Cited
UNITED STATES PATENTS

| | | | |
|---|---|---|---|
| 3,338,089 | 8/1967 | Coombs et al. | 73/80 |
| 3,338,090 | 8/1967 | Coombs et al. | 73/80 |
| 3,449,946 | 6/1969 | Gabriel et al. | 73/80 |
| 3,531,984 | 10/1970 | Halberg | 73/80 |
| 3,597,964 | 8/1971 | Heine et al. | 73/80 |

*Primary Examiner*—James J. Gill
*Assistant Examiner*—Anthony V. Ciarlante

[57] ABSTRACT

An applanation tonometer comprises a housing defining upper and lower vertically extending passages in visual communication with each other and at least one vertically extending slot adjacent the lower passage and open at the bottom end thereof. An applanating means of fiber optic material disposed in the lower passage includes an applanating surface adjacent the bottom end thereof and a reticule of reference markings adjacent the upper end thereof. Tab means slidably mounted in the slot and secured to the applanating means for movement therewith movably mount the applanating means in the lower passage for reciprocal movement parallel to the axis of the latter, while stop means secured to the housing and releasably closing the open end of the slot maintain the tab means in the slot. A light tube of light-transmissive and light-diffusive material disposed in the upper passage contains a light source, and directs illumination therefrom onto the reticule and the applanating surface. The use of fiber optic material in the applanating means permits the optical superposition of the reticule and applanating surface without optical distortion, and without irritation to the applanated surface of the cornea, and without requiring use of a protective cover cemented to the applanating means. The applanating means is removable from the housing and sterilizable.

11 Claims, 6 Drawing Figures

APPLANATION TONOMETER

BACKGROUND OF THE INVENTION

In applanation tonometry, an area of the cornea of the eye is flattened by applying a plane surface against the eyeball. The tonometric pressure is determined from the ratio between the force with which the surface is applied against the eyeball and the size of the flattened area of the cornea. The intraocular pressure multiplied by the magnitude of the flattened area equals the force with which the surface is pressed against the eyeball. From this relation, the ocular pressure may be determined from a measure of a known force and an observed area size.

A prior art example of a direct view applanation tonometer is that appearing in U.S. Pat. No. 3,531,984. The described tonometer includes a lens, support means containing the lens, and optically transparent applanating means formed of glass or plastic movably mounted in the support means along the optical axis of the lens. To determine the magnitude of the flattened area of the eye, the applanating means is provided with a reticule of reference markings in the form of graduated scales or concentric circles embossed on the applanating or eye-contacting surface. Parallax between an applanated cornea and the reference markings, as viewed through the lens, is utilized to show non-perpendicularity of the instrument and thus insure correct placement of the instrument perpendicular to the eye at the point of contact. It is noted, however, that in order to avoid irritation of the cornea by the reticule embossing on the applanating surface of the applanating means, the commercial version of this tonometer requires use of a smooth, thin optically transparent cover which is cemented over the applanating end of the applanating means and becomes in fact the applanating surface.

The commercially available direct view applanating tonometers have not been proven to be entirely satisfactory in use. It is essential that the applanating means be maintained scrupulously clean for two important reasons, first, in order to prevent infection of the patient's cornea by foreign matter carried on the applanating surface, and, second, to maintain the applanating means at a constant weight so that there is a known force being applied to the cornea. The preferred method for cleaning the applanating means is autoclaving, a simple and economical high temperature sterilization procedure. In the prior art tonometers the applanating means is not autoclavable in the first instance because the applanating means is not readily removable from the remainder of the tonometer (including electrical circuitry in a self-illuminating tonometer), and in the second instance because, even if the applanating means were removable from the remainder of the tonometer, the cement used to secure the cover to the lower end of the applanating means is not capable of withstanding the prolonged high temperatures characteristic of autoclaving.

A further disadvantage of the prior art self-illuminating tonometers, equipped with a light source to permit easy viewing of both the reference markings and the applanated surface of the cornea, is that the ophthalmologist's view is typically obstructed either by the light source itself (e.g., the bulb) or by a reflecting device (e.g., a mirror) used to beam illumination from a remote light source into the desired areas.

Accordingly, it is an object of the present invention to provide an applanation tonometer wherein the reticule and applanating surface are optically superpositioned without optical distortion, without irritation to the applanated surface of the cornea, and without the use of a protective cover cemented to the applanating means.

Another object is to provide such a tonometer wherein the applanating means is easily removable from the housing of the tonometer, and is of cement-free construction permitting cleaning and sterilization by autoclaving.

A further object to provide such a tonometer wherein a reticule of reference markings is disposed on the opposite end of the applanating means from the applanating surface thereof to eliminate cornea irritation.

Yet another object is to provide such a tonometer having illuminating means wherein neither the light source nor a reflecting surface impairs the working view of the ophthalmologist using the tonometer.

SUMMARY OF THE INVENTION

It has now been found that the above and related objects of the present invention are obtained in an applanation tonometer comprising a housing defining first and second passages in visual communication with each other, and applanating means movably mounted in one of the passages for reciprocal movement parallel to the axis thereof and including an applanating surface adjacent one end thereof and a reticule of reference markings adjacent the other end thereof. Typically the first and second housing passages have vertically aligned axes, the first passage being disposed above the second passage. The applanating means is slidably mounted in the second passage with the applanating surface being disposed on the lower end of the applanating means and the reticule being disposed on the upper end of the applanating means.

In a preferred embodiment the applanating means are comprised exclusively of fiber optic material so that the view presented to the applanating surface at one end of the applanating means is superimposed upon the reticule of reference markings at the other end of the applanating means. Thus, the use of fiber optic material in the applanating means permits superpositioning of the reticule and the applanating surface without optical distortion, without the danger of cornea irritation due to placement of the reticule on the applanating surface, and without requiring the use of a protective cap cemented onto the applanating surface to protect the cornea from the reticule.

In another preferred embodiment, the housing further defines, adjacent the lower passage thereof, at least one vertically extending slot open at the bottom end thereof. Tab means are slidably mounted in the slot and secured to the applanating means for movement therewith and for movably mounting the applanating means in the lower passage for reciprocal movement parallel to the axis thereof. Stop means are secured to the housing for releasably closing the open end of the slot to maintain the tab means in the slot. The stop means are removable from the housing to open the slot and permit removal of both applanating means and tab means from the slot and housing for cleaning of the applanating surface. The tab means are preferably releasably secured to the applanating means so that tab means of different weights may be used in conjunction with a single applanating means.

In a further preferred embodiment, a light tube of light-transmissive and light-diffusive composition is disposed in the upper passage and is operatively connected to a light source, the light tube directing illumination from the light source into the lower passage onto the reticule and applanating surface. Preferably the light tube is of annular configuration and an internal light source is provided within a recess of the light tube accessible from the top surface thereof. The light tube has a light reflective composition functionally disposed on the top surface thereof, the exterior surface thereof, and a segment of the interior surface thereof extending from the top surface thereof downwardly a substantial length of the interior surface. The remaining segment of the interior surface and the bottom surface of the light tube comprise a light transmissive portion of the light tube for directing illumination from the light source into the lower passage of the housing.

DETAILED DESCRIPTION OF THE PREFERRED EMBODIMENTS

Figures 1, 2:
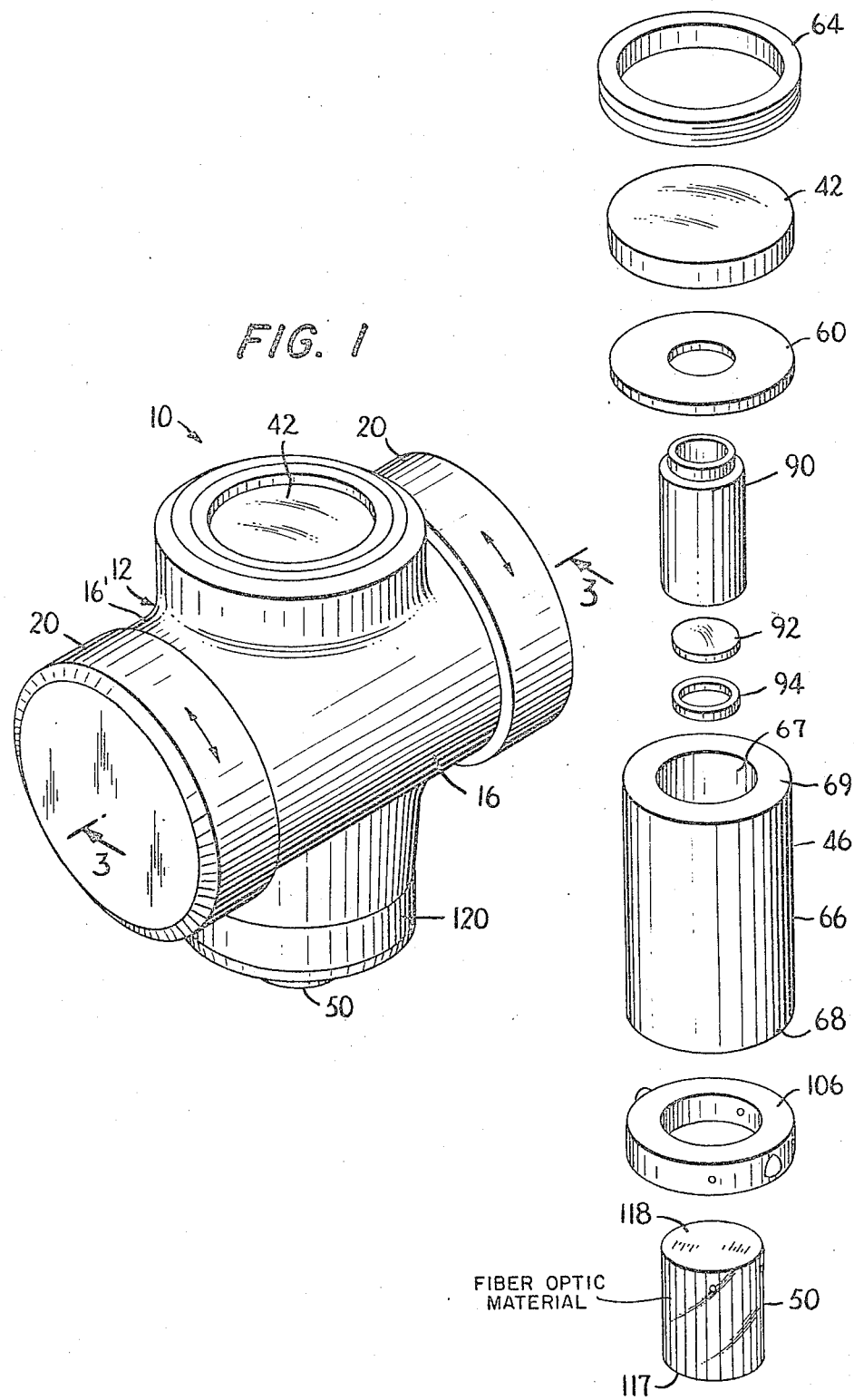
FIG. 1 is an isometric view of a direct view applanation tonometer according to the present invention.
FIG. 2 is an exploded isometric view of the elements of the tonometer of FIG. 1 situated along the housing central passage.
Figure 3:
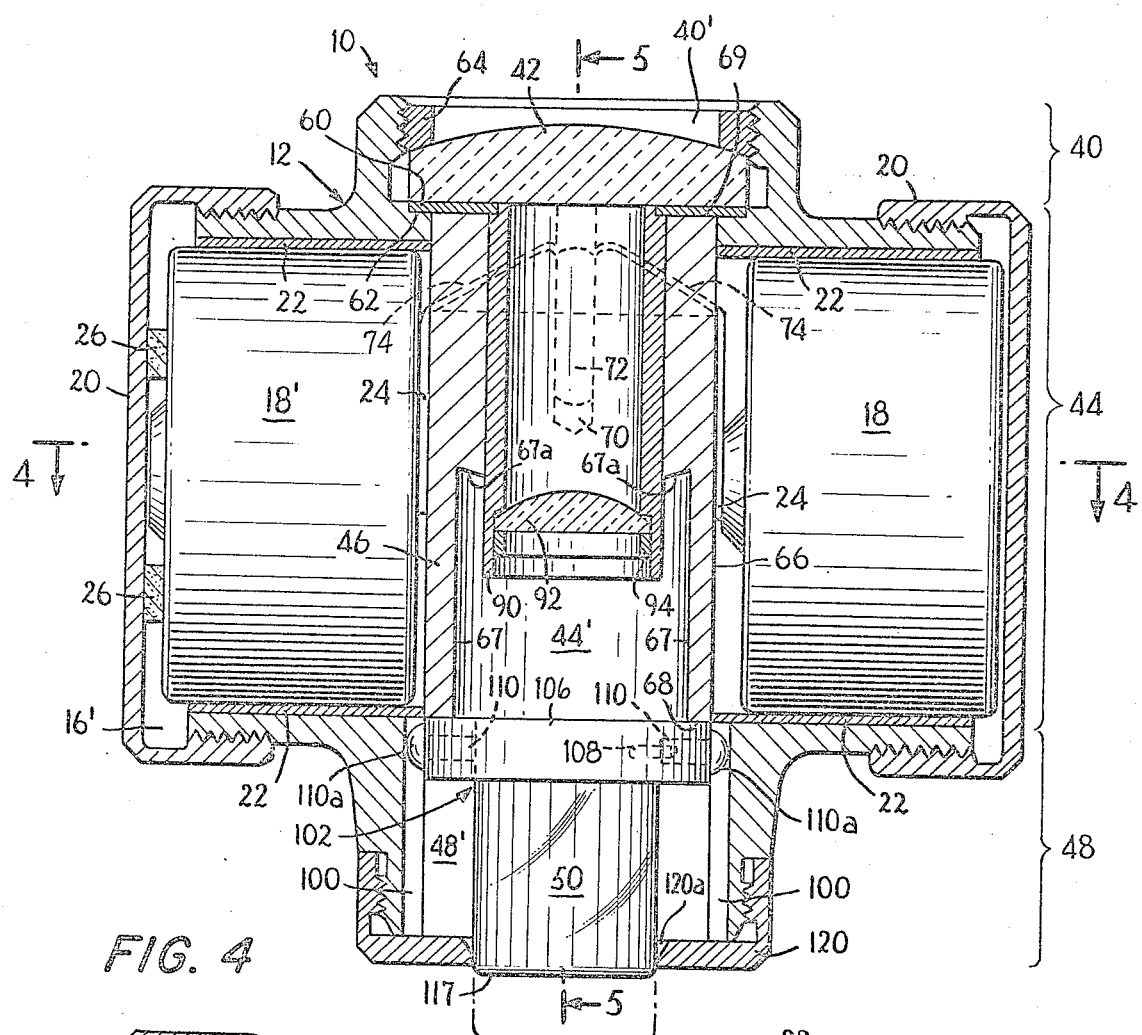
FIG. 3 is a side sectional view taken along the line 3—3 of FIG. 1.
Figure 4:
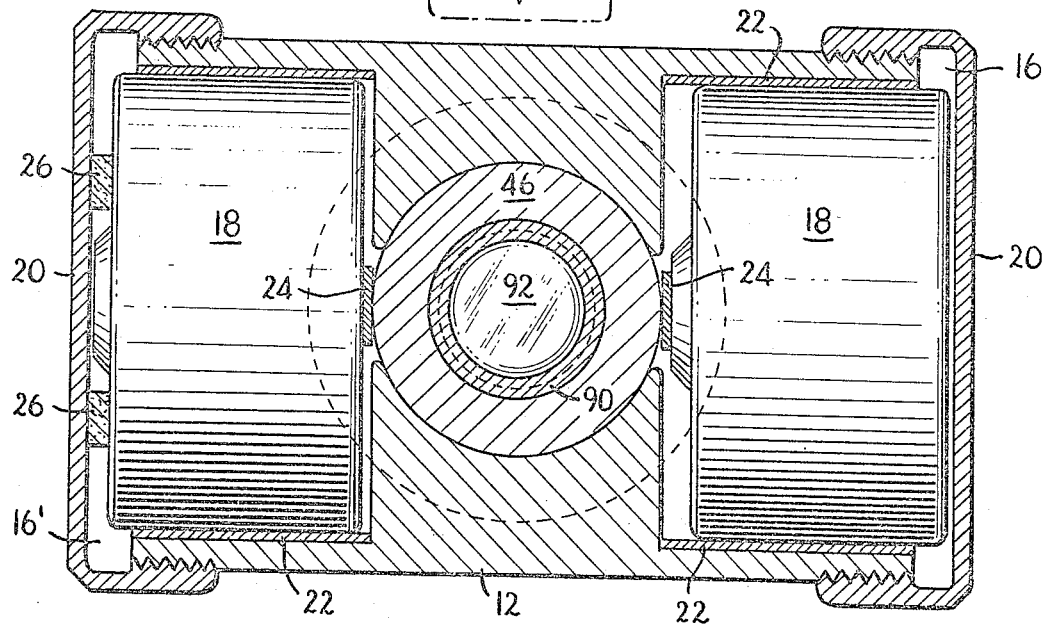
FIG. 4 is a top sectional view taken along the line 4—4 of FIG. 3.
Figure 5:
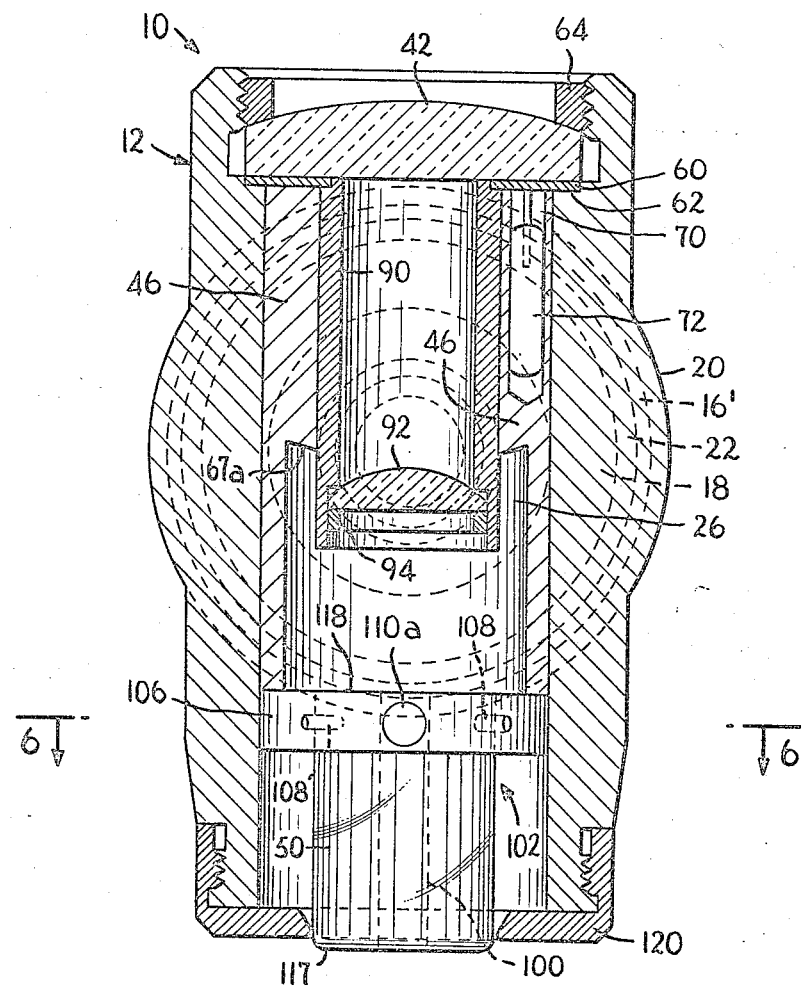
FIG. 5 is a side sectional view taken along the line 5—5 of FIG. 3, the tonometer thus being rotated horizontally 90° from the position illustrated in FIG. 3.
Figure 6:
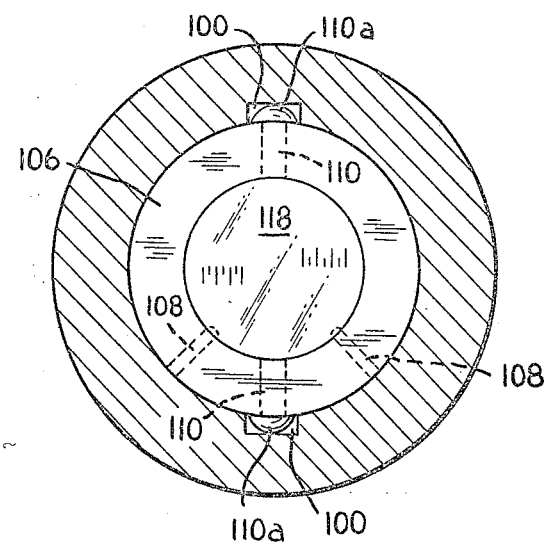
FIG. 6 is a top sectional view taken along the line 6—6 of FIG. 5.

Referring now to the drawing, and in particular to FIGS. 1 and 3–4 thereof, therein illustrated is a self-illuminating direct view applanation tonometer according to the present invention, generally designated 10. The tonometer housing generally designated 12 is formed of an electrically conductive metal such as brass and defines an axially extending central passage therethrough and a pair of radially extending, laterally disposed cylindrical compartments 16, 16' thereabout for receipt of batteries 18.

The battery compartments 16, 16' are disposed at opposite ends of a diameter through the axis of the housing central passage. The cap 20 of each battery compartment 16, 16' is formed of electrically conductive metal and is internally threaded so as to be removable from the externally threaded outer end of the compartment 16, 16' to permit battery replacement as needed. The inner cylindrical side of each compartment 16, 16' adjacent its battery 18 is covered with electrically insulative material 22 while the end of each compartment 16, 16' adjacent the housing central passage is fitted with a terminal 24 of electrically conductive material.

In one compartment 16 (the one shown on the right of FIGS. 3 and 4), the battery 18 is continually in contact with both terminal 24 and cap 20; in the other compartment 16' (shown on the left in FIGS. 3 and 4), the battery 18 is always in contact with terminal 24, but may or may not be in electrical contact with cap 20 depending upon the degree to which cap 20 is screwed onto the outer end of compartment 16'. A ring 26 of resilient electrically insulative material such as sponge rubber is affixed to the cap 20 of compartment 16' to bias the battery 18 away from the cap 20. The ring 26 resiliently separates the battery 18 from the cap 20 when the cap 20 is only loosely screwed on the housing 12, but permits electrical contact between cap 20 and battery 18 when the cap is further screwed onto the housing 12 to compress the ring 26. Accordingly, cap 20 of compartment 16' acts as an on-off switch for the entire electrical circuitry of the tonometer 10.

Referring now to FIGS. 2–3 in particular, housing 12 about the vertically extending central passage is conceptually dividable into three segments or portions. An upper or top portion generally designated by the numeral 40 defines a passage 40' and contains an eyepiece 42. An intermediate portion generally designated by the numeral 44 defines a passage 44' and contains a light tube 46. A lower or base portion generally designated by the numeral 48 defines a passage 48' and contains applanating means 50.

The eyepiece 42 within the upper housing portion 40 is a plano-convex lens supported by a cylindrical shield 60 which in turn rested upon a horizontally internally-extending circular flange 62 of housing 12. An externally threaded retainer ring 64 is mounted in the internally threaded upper segment of the top housing portion 40 and presses against the upper surface of the eyepiece 42 to maintain it in position against the shield 60. For reasons which we will describe in detail hereinafter, the upper surface of the shield 60 is black anodized to provide a dark background about the optical axis of the tonometer 10, and the lower surface is white anodized to provide a light reflecting surface.

The light tube 46 within the intermediate housing portion 44 is of generally annular configuration and has an outer surface 66, an inner surface 67, a lower end 68 and an upper end 69. The outer surface 66 is of constant diameter, while the inner surface 67 of a top segment of the light tube 46 decreases in diameter to that of the bottom segment of the light tube 46 at flange 67a which deviates 15° downwardly and inwardly from the horizontal. The outer surface 66 is secured to the housing 12 by conventional means (for example, a heat weld) and serves as the inner ends of the battery compartment 16, 16' to which the terminals 24 are secured. A downwardly extending recess 70 in the upper surface 66 receives a localized light source such as a light bulb 72 connected by electrically conductive wires 74 to the battery compartment terminals 24. The light tube 46 is composed of a translucent plastic such as methacrylate polymer which acts to transmit and diffuse the light emanating from the local light source 72 throughout the entire light tube 46. For reasons which will be described in detail hereinafter, the outer wall 66 of the light tube 46 is white anodized to provide a light reflecting surface.

Disposed within the hollow of the annular light tube 46 is a cylindrical jacket 90 which extends downwardly from the shield 60 to which it is secured (for example, by a heat weld) to below the level of flange 68. The lower segment of the jacket 90 has a slightly increased inner diameter relative to that of the upper segment and is adapted to receive therein a plano-convex objective lens 92 supported by a frictionally-engaged resilient retaining ring 94. For reasons which will be described in detail hereinafter, the inner surface of the jacket 90 is black anodized to provide a dark background about the optical axis, and the outer surface is white anodized to provide a light reflecting surface.

The lower housing portion 48 is provided with a pair of axially extending slots or channels 100, one slot 100 at either end of a diameter through passage 48'. Each slot 100 extends to the button end of the lower housing portion 48 and is open at its bottom end. A plunger generally designated by the numeral 102 is slideably mounted in the lower housing portion 48 and comprises a vertically extending optically transparent cylindrical applanating means 50, a horizontally extending metal weight ring 106, a pair of horizontally extending metal set screws 108 disposed at right angles to one another for mounting the weight ring 106 on the upper segment of the applanating means 50 for movement therewith, and a pair of aligned horizontally extending tab means such as metal rivets 110 secured to the weight ring 106 and having their heads 110a slidably mounted in slots 100. The planar lower surface of the applanating means 50 acts as the applanating or eye-contacting surface 117, while the upper surface thereof has a reticule 118 of high contrast reference markings engraved and etched thereon for determining the applanated area of the cornea. A stop ring 120 having an aperture 120a permitting passage of the applanating means 50 therethrough is removably mounted on the lower segment of the lower housing portion 48. As illustrated, the stop ring 120 has an upwardly extending flange provided with an internal thread which engages an external thread on the lower segment of the lower housing portion 48; obviously, however, other conventional fastening techniques may also be utilized to removably mount the stop ring 120 on the housing 12. When suitably mounted, the stop ring 120 extends over the open ends of the slots 100 and so precludes separation of the plunger 102 from the housing 12. Thus, as shown in FIG. 3, the plunger 102 is slidably mounted in the housing slots 100 for movement between an elevated or raised position occupied during applanation (illustrated in solid line) and a lowered position (illustrated on phantom line) occupied when the plunger 102 is being maintained within the housing 12 against the force of gravity essentially by means of the stop ring 120.

The applanating means 50 is formed exclusively of fiber optic material. Such fiber optic material consists of thousands of clad glass fibers fused together to form a rigid bundle or rod which is capable of transmitting an image from one end to the other, the image viewed at one end (i.e., at the top) being identical with the image presented at the other end (i.e., at the bottom). As the view of the applanated cornea presented to the applanating surface 117 is faithfully superimposed or superpositioned on the reticule 118 without optical distortion, the advantages of a reticule located directly on the applanating surface are achieved without the disadvantage inherent in such an arrangement. Thus the use of fiber optic material in the applanating means 50 permits embossing of the reticule 118 at the top of the applanating means 50 so that there is no danger of irritation of the cornea by the reticule 118 while avoiding the refraction or optical distortion which would normally arise from such a placement of the reticule 118 if the applanting means 50 were made of conventional glass or plastic material. As no cover is now required to protect the cornea from irritation by the reticule 118, the entire plunger 102 may be removed from the housing 112 simply by unscrewing the stop ring 120 and permitting the rivet heads 110a to drop out of the open ends of slots 100. The entire plunger 102 (or, if desired, just the applanating surface 117) may thus be autoclaved and the sterilized plunger 102 then replaced in the housing 12 for immediate use or maintained in a sterile environment for a period of time and reinserted in the housing 12 just prior to use.

The applanating force being applied to the cornea may be varied by use of appropriate weight rings 106 in conjunction with the applanating means 50. Substitution of appropriate weight rings 106 is easily accomplished, once the plunger 102 is separated from the housing 12, by loosening the set screws 108, replacing the existing weight ring 106 with the desired weight ring 106, and retightening the set screws 108. If desired a set of plungers 102 of varying weights may be maintained ready for use.

It will be noted that the housing 12 and the battery compartment caps 20 are formed of an electrically conductive metal such as brass and thus provides a common ground for the illumination system. The batteries 18 are arranged in the compartments 16, 16' to act in series to energize the light source 72, the positive terminal of one battery 18 being connected by terminal 24 and wire 74 to one terminal of the light suppply 72, and the negative pole of the other battery 18 being connected by the other terminal 24 and the other wire 74 to the other terminal of the light supply 72. The light generated by the localized light source 72 is transmitted and diffused by means of the light tube 46 to provide a downwardly and centrally directed illumination onto reticule 118 and passage 48', the only illumination escaping the light tube 46 being that passing through the functional light-transmissive portion comprising flange 67a, bottom end 68 and the portion of the inner surface 67 therebetween. The remaining surfaces of light tube 46 are not functionally light transmissive; upwardly directed light is reflected back into the light tube 46 by the white anodized lower surface of the shield 60, light directed outwardly is reflected back by the white anodized surface of the light tube outer wall 66, and light directed inwardly by the portion of the inner wall 67 above the flange 67a is reflected back by the white anodized outer surface of the jacket 90. The black anodized upper surface of the shield 60 and the inner wall of the jacket 90 provide a suitable dark background facilitating viewing of the applanated surface of the cornea and reading of the reticule. The eyepiece lens 42 and the objective lens 92 form a magnification system focused on the reticule 118 (i.e., the top of the applanating means 104) when the applanating means 104 is in its correct elevated or applanating position. The inner diameter of the light tube 46 is preferably at least as large as the outer diameter of the applanating means 104 so that the opthamologist's view of the reticule 118 and the applanating surface 117 (and hence the applanated cornea surface) through the eyepiece lens 42 is unimpaired.

In assembling the tonometer 10, the initial step consists of mounting the light tube 46 within the housing central passage 14. The objective lens 94 is then inserted in the bottom segment of jacket 90 and secured there by means of retaining ring 94. The top end of the jacket 90 is then welded to the inner and lower surfaces of the shield 60, the unit thus constructed being slipped into the housing 12 with the outer wall of jacket 90 fitting within the light tube 46 and the lower surface of the shield 60 resting partially atop the upper light tube surface 69 and partially atop the housing flanges 62. The eyepiece lens 42 is next inserted with its bottom surface pressing down on the upper surface of the shield 60 and the retainer ring 64 is finally threaded into the housing upper portion 40 to maintain the eyepiece 42 in position.

To use the tonometer, a patient is placed in a horizontal position and the corneal surface of his eye is desensitized or anesthetized by conventional techniques. The cover 20 of compartment 16' is then tightened on the housing 12 to complete the electrical circuit and energize the light source 72. The applanating surface of the tonometer is next lightly placed perpendicular to the point of contact on the upturned eye and then pressed against the eye until the plunger 102 assumes its elevated position, at which point the typical wet ring pattern will be observed on the cornea. The pressure is released once the surface area of the cornea undergoing applanation is noted using the reference markings on the reticule 113. If the readings indicate that use of a plunger 102 with a different weight is called for, the tonometer 10 is removed from the eye, the present plunger 102 replaced by one of an appropriate weight, and the procedure is then repeated. When a satisfactory reading is obtained, the intraocular pressure is determined using calibration tables suitable for the particular plunger weight utilized.

In summary, an applanation tonometer has been described which permits the plunger to be removed and autoclaved to reduce the changes of infection and insure that the desired weight of the plunger is not affected by contaminants adhereing thereto. Furthermore, means are provided for illuminating both the reticule and the applanated surface of the cornea without impairing the vision of the opthamologist using the tonometer. The readings obtained with the tonometer are of exceptional accuracy both because the weight of the plunger system is less likely to vary over time and because the use of fiber optic material in the applanating means has the effect of superimposing the applanated surface of the cornea and the reticule of reference markings atop the applanating means without the introduction of errors caused by refraction distortion.

Now that the preferred embodiments of the present invention have been shown and described in detail, various modifications and improvements thereon will become readily apparent to those skilled in the art. Accordingly, the scope of the present invention is to be considered as limited only by the appended claims, and not by the foregoing disclosure.

I claim:

1. A direct view applanation tonometer comprising:
   A. a housing defining upper and lower passages in visual communication with each other and having vertically aligned axes; and
   B. applanating means comprising fiber optic material slidably mounted in said lower passage for reciprocal movement parallel to the axis thereof and including an applanating surface disposed on the lower end thereof and a reticule of reference markings disposed on the upper end thereof, at least portions of said applanating surface and said reticule being viewable through the top of said housing.

2. The tonometer of claim 1 wherein said applanating means is slidably movable between a raised position and a lowered position, and additionally including an optical magnification system focused on said reticule of said applanating means when said applanating means is in said raised position.

3. An applanation tonometer comprising:
   A. a housing defining vertically extending upper and lower passages in visual communication with each other, and at least one vertically extending slot adjacent said lower passage and open at one end thereof;
   B. applanating means formed of fiber optic material including an applanating surface disposed at the bottom thereof and a reticule of reference markings disposed at the top thereof;
   C. tab means slidably mounted in said slot and secured to said applanating means for movement therewith and for movably mounting said applanating means in said lower passage for reciprocal movement parallel to the axis thereof while precluding rotation of said applanating means about the axis thereof, and
   D. stop means secured to said housing and releasably closing said open end of said slot to releasably maintain said tab means in said slot.

4. The tonometer of claim 3 wherein said open end of said slot is at the bottom end thereof.

5. The tonometer of claim 3 wherein said stop means is releasably secured to said housing by a threaded engagement therewith, whereby said stop means may be released from said housing to open said open end of said slot, thereby permitting removal of said tab means and said applanating means from said slot and said housing.

6. The tonometer of claim 3 wherein said tab means is releasably secured to said applanating means.

7. An applanation tonometer comprising:
   A. a housing defining first and second passages in visual communication with each other along a line of sight;
   B. applanating means formed of fiber optic material movably mounted in said second passage for reciprocal movement parallel to the axis thereof and including an applanating surface at the bottom and a reticule of reference markings at the top thereof; and
   C. a substantially tube-like member of light-transmissive material disposed in said upper passage, substantially surrounding the line of sight in said upper passage and operatively connected to a light source, said light tube directing illumination from the light source into said second passage.

8. The tonometer of claim 7 wherein said light tube has a light reflective composition functionally disposed on the top surface thereof, the exterior surface thereof, and a segment of the interior surface thereof extending downwardly from the top surface thereof a substantial length of said interior surface, the remaining segment of said interior surface and the bottom surface of said light tube comprising a light-emissive portion of said light tube.

9. The tonometer of claim 8 additionally including an optical magnification system for visually accessing said reticule from the exterior of said housing comprising a plurality of lenses disposed above said light-emissive tube portion.

10. The tonometer of claim 7 wherein said light tube is of an annular configuration and defines a recess accessible from the top surface thereof for receiving an internal light source therein.

11. A direct view applanation tonometer comprising:
A. a housing defining upper and lower vertically extending passages in visual communication with each other along a line of sight and at least one vertically extending slot adjacent said lower passage and open at the bottom end thereof;
B. a substantially tube-like member of light-transmissive material disposed in said upper passage, substantially surrounding the line of sight in said upper paassage and operatively connected to a light source;
C. applanating means of fiber optic material disposed in said lower passage and including an applanating surface adjacent the bottom end thereof and a reticule of reference marking adjacent the upper end thereof, at least portions of said applanating surface and said reticule being viewable through the top of said housing;
D. tab means slidably mounted in said slot and secured to said applanating means for movement therewith and for movably mounting said applanating means in said lower passage for reciprocal movement parallel to the axis of the latter while precluding rotation of said applanating means about the axis thereof; and
E. stop means secured to said housing and releasably closing said open end of said slot to maintain said tab means in said slot.

* * * * *